United States Patent
Sugimoto et al.

(10) Patent No.: US 6,839,221 B2
(45) Date of Patent: Jan. 4, 2005

(54) MULTILAYER CERAMIC CAPACITOR AND PROCESS FOR PREPARING THE SAME

(75) Inventors: Koshiro Sugimoto, Kokubu (JP); Osamu Toyama, Kokubu (JP); Koji Ishimine, Kokubu (JP); Yuichi Komoto, Kokubu (JP); Manabu Maeda, Kokubu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/786,526

(22) Filed: Feb. 25, 2004

(65) Prior Publication Data

US 2004/0233612 A1 Nov. 25, 2004

(30) Foreign Application Priority Data

May 25, 2003 (JP) .......................................... 2003-048234
May 28, 2003 (JP) .......................................... 2003-151139

(51) Int. Cl.⁷ ............................. H01G 4/06; H01G 4/20; H01G 4/30
(52) U.S. Cl. ................... 361/321.2; 361/313; 361/301.4
(58) Field of Search ...................... 361/301.4, 311–312, 361/306.1, 306.3, 308.1, 304, 320, 321.1, 321.2, 321.3, 321.4, 321.5

(56) References Cited

U.S. PATENT DOCUMENTS

| | | | | |
|---|---|---|---|---|
| 5,731,950 A | * | 3/1998 | Sakamoto et al. | 361/321.4 |
| 5,995,360 A | * | 11/1999 | Hata et al. | 361/321.5 |
| 6,144,547 A | * | 11/2000 | Retseptor | 361/303 |
| 6,229,686 B1 | * | 5/2001 | Shimahara et al. | 361/311 |

FOREIGN PATENT DOCUMENTS

| | | |
|---|---|---|
| JP | 09-097733 | 4/1997 |
| JP | 10-241987 | 9/1998 |

* cited by examiner

*Primary Examiner*—Eric Thomas
(74) *Attorney, Agent, or Firm*—Hogan & Hartson LLP

(57) ABSTRACT

The mean grain size (D2) of the main crystal phase 11 in the external cover dielectric layers 3 is made larger than the mean grain size (D1) of the main crystal phase 11 in the dielectric ceramic layers 7, and the amount of the secondary phase (M2) in the external cover dielectric layer 3 is made more than the amount of the secondary phase (M1) in the dielectric ceramic layer 7, or the volume proportion of the secondary phase 16 to the main crystal phase 11 in the external cover dielectric layer 3 is made lower than the volume proportion of the secondary phase 16 to the main crystal phase 11 in the dielectric ceramic layer 7. This constitution produces the multilayer ceramic capacitor having a large number of thin layers stacked one on another that is capable of suppressing the occurrence of delamination between the external cover dielectric layers and the effective dielectric material section and between the effective dielectric material sections due to the difference in shrinkage by firing even when particle size of the dielectric material powder is made smaller.

9 Claims, 3 Drawing Sheets

MULTILAYER CERAMIC CAPACITOR AND PROCESS FOR PREPARING THE SAME

Priority is claimed in Japanese Patent Applications No. 2003-48234 filed on Feb. 25, 2003, and No. 2003-151139 filed on May 28, 2003, the disclosure of which is incorporated by reference in its entirety.

BACKGROUND OF THE INVENTION

1. Field of the Invention

The present invention relates to a multilayer ceramic capacitor and a process for preparing the same, and particularly to a multilayer ceramic capacitor that comprises an effective dielectric material section consisting of thin dielectric ceramic layers and internal electrode layers stacked alternately, and external cover dielectric layers that are stacked on the upper and lower surfaces of the effective dielectric material section for the protection thereof, and a process for preparing the same.

2. Description of Related Art

Recently, as electronic components become increasingly smaller in size and higher in functionality, efforts have been made to manufacture multilayer ceramic capacitors that are smaller in size and larger in capacity. Specifically, such multilayer ceramic capacitors have been manufactured as the dielectric ceramic layer thereof is made thinner to a thickness (distance between internal electrodes) of 10 $\mu$m or less and 100 or more internal electrode layers are stacked. With such a trend toward thinner dielectric ceramic layers, the mean grain size of main crystal phase that constitute the dielectric ceramic layers has been reduced to about 1 $\mu$m while particle size of the dielectric material powder and glass powder used to make it have been made smaller. Such technologies have been disclosed in, for example, Japanese Unexamined Patent Publication No. 10-241987 and Japanese Unexamined Patent Publication No. 9-97733.

However, in such a multilayer ceramic capacitor made by using dielectric material powder and glass powder of fine particles as described above, high shrinkage ratio of the dielectric material powder after firing causes the protective external cover dielectric layer 107 to shrink at a higher rate than the effective dielectric material section 105 that includes the dielectric ceramic layers 101 and the internal electrode layers 103. As a result, the external cover dielectric layer 107 tends to become smaller in size as shown in FIG. 3 (dimension of the external cover dielectric layer 107 before shrinkage is denoted as L1 and dimension thereof after shrinkage is denoted as L2). In such a multilayer ceramic capacitor, strain due to difference in shrinkage after firing has been causing cracks and/or delamination between the external cover dielectric layer and the effective dielectric material section and between the effective dielectric material sections.

SUMMARY OF THE INVENTION

An advantage of the present invention is to provide a multilayer ceramic capacitor that can suppress the occurrence of cracks and/or delamination between the external cover dielectric layer and the effective dielectric material section and between the effective dielectric material sections due to the difference in shrinkage after firing, despite the use of dielectric material power of finer particles, and a process for preparing the same.

The multilayer ceramic capacitor of the present invention comprises an effective dielectric material section where dielectric ceramic layers that include a main crystal phase made mainly of at least $BaTiO_3$ and a secondary phase made mainly of $SiO_2$ that forms grain boundary and triple point boundary and internal electrode layers are stacked alternately, external cover dielectric layers that are formed on the upper and lower surfaces of the effective dielectric material section and includes a main crystal phase and a secondary phase comprising at least the same components as those of the dielectric ceramic layers, and external electrodes that are connected with the internal electrode layers led onto both end faces of the effective dielectric material section which includes the external cover dielectric layers, wherein the external cover dielectric layers comprises ceramics which has lower sinterability than the dielectric ceramic layers of the effective dielectric material section.

Specifically, the multilayer ceramic capacitor of the present invention has such a constitution as the mean grain size of the main crystal phase in the external cover dielectric layer is larger than the mean grain size of the main crystal phase in the dielectric ceramic layer, and the amount of the secondary phase in the external cover dielectric layer is more than the amount of the secondary phase in the dielectric ceramic layer. This constitution makes it possible to decrease the difference in final shrinkage after firing between the external cover dielectric layer and the effective dielectric material section, reduce the internal stress (strain) generated between the external cover dielectric layer and the effective dielectric material section by reducing the shift of the shrinkage starting temperature toward higher temperature even when the mean particle size of the dielectric material powder is made larger, thereby to suppress cracks and delamination from occurring in the multilayer ceramic capacitor made by stacking larger number of thinner layers.

The multilayer ceramic capacitor of the present invention may also be made by setting the volume proportion of the secondary phase to the main crystal phase in the external cover dielectric layer smaller than the volume proportion of the secondary phase to the main crystal phase in the dielectric ceramic layer. This constitution also produces the multilayer ceramic capacitor free of delamination even when fine particles are used in the main crystal phase that constitutes the dielectric ceramic layer.

A process for preparing the multilayer ceramic capacitor according to the present invention comprises the steps of forming a laminate comprising an effective laminate made by interposing internal electrode pattern between a plurality of first dielectric material green sheets that include dielectric material powder and glass powder and are stacked one on another, and external cover layers that are placed on the upper and lower surfaces of the effective laminate and are made from second dielectric material green sheets which include the same dielectric material powder and the glass powder as those of the first dielectric material green sheets; and cutting and firing the laminate, wherein the dielectric material powder and the glass powder are included in the green sheets in such a proportion as the second dielectric material green sheets have lower sinterability than the first dielectric material green sheets.

Specifically, the mean particle size of the dielectric material powder included in the second dielectric material green sheet is made larger than the mean particle size of the dielectric material powder included in the first dielectric material green sheet, and the amount of glass powder included in the second dielectric material green sheets is made larger than the amount of the glass powder included in the first dielectric material green sheet.

Such a manufacturing method enables it to make the mean grain size of the main crystal phase of the external cover dielectric layer larger than the mean grain size of the main crystal phase of the effective dielectric material section, and set the amount of the secondary phase larger in the external cover dielectric layer than in the effective dielectric material section, so that the multilayer ceramic capacitor that enables it to decrease the difference in final shrinkage after firing between the external cover dielectric layer and the effective dielectric material section can be easily fabricated. That is, shift of the shrinkage starting temperature toward higher temperature can be made smaller even when the mean particle size of the dielectric material powder is made larger, thereby making it easier to manufacture the multilayer ceramic capacitor that can suppress cracks and delamination from occurring, despite stacking a larger number of thinner layers.

Alternatively, proportion of the glass component in the second dielectric material green sheet may be made smaller than the proportion of the glass component in the first dielectric material green sheet.

As a result, even in the multilayer ceramic capacitor made by stacking a larger number of thinner layers made of finer powder, the volume proportion of the secondary phase that forms the grain boundary and triple point boundary in the ceramics structure of the external cover dielectric layer may be made lower than the volume proportion of the secondary phase in the effective dielectric material section. Specifically, when the volume proportion of the secondary phase in the external cover dielectric layer is set in a range from 60 to 95% of the volume proportion of the secondary phase in the dielectric ceramic layers that constitute the effective dielectric material section, it is made possible to delay the start of shrinkage of the external cover dielectric layer thereby to achieve a changing pattern near the shrinkage curve for the firing temperature of the effective dielectric material section. Thus it is made possible to suppress the stress generated in the interface between the effective dielectric material section and the external cover dielectric layer due to the difference in the shrinkage starting temperature during firing, thereby to prevent delamination from occurring in the interface and between the internal electrode layer and the dielectric ceramic layer near the interface.

DESCRIPTION OF PREFERRED EMBODIMENTS (First aspect)

Figure 1:
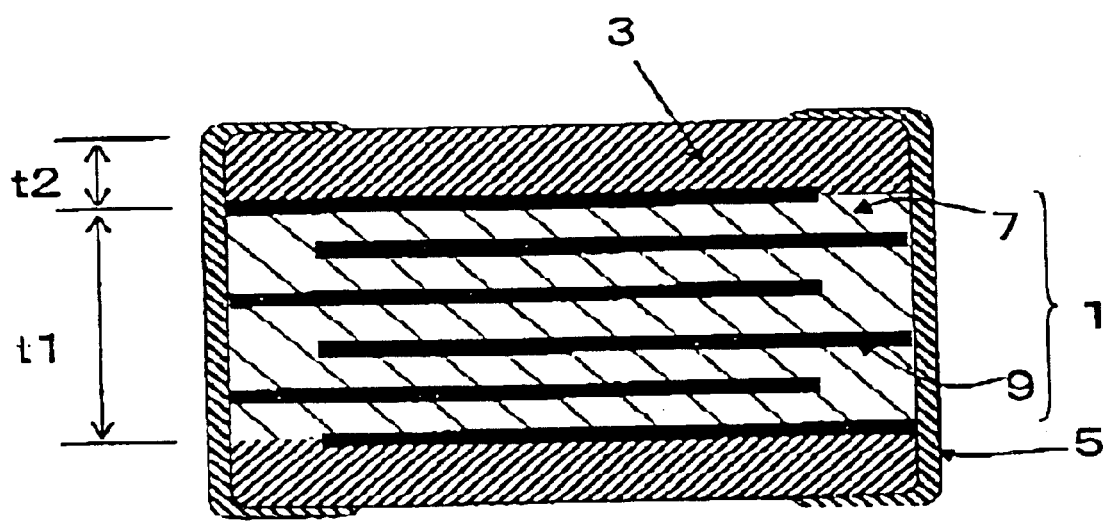
FIG. 1 is a schematic sectional view showing an embodiment of the multilayer ceramic capacitor according to the present invention.

The multilayer ceramic capacitor of this embodiment comprises an effective dielectric material section 1 that contributes to the development of capacitance, external cover dielectric layers 3 that are placed on the upper and lower surfaces of the effective dielectric material section 1 and do not contribute to the development of capacitance, and external electrodes 5 formed at the ends of the effective dielectric material section 1 and the external cover dielectric layers 3. The effective dielectric material section 1 is constituted by stacking the external cover dielectric layers 7 and the internal electrode layers 9 alternately.

It is preferable that the thickness (t1) of the effective dielectric material section 1 and the thickness (t2) of the external cover dielectric layer 3 satisfy the relation of t2/t1≧0.05. It is particularly preferable to apply the present invention to a case where the ratio t2/t1 is 0.1 or larger, and the external cover dielectric layer 3 has greater influence on the effective dielectric material section 1.

Figure 2:
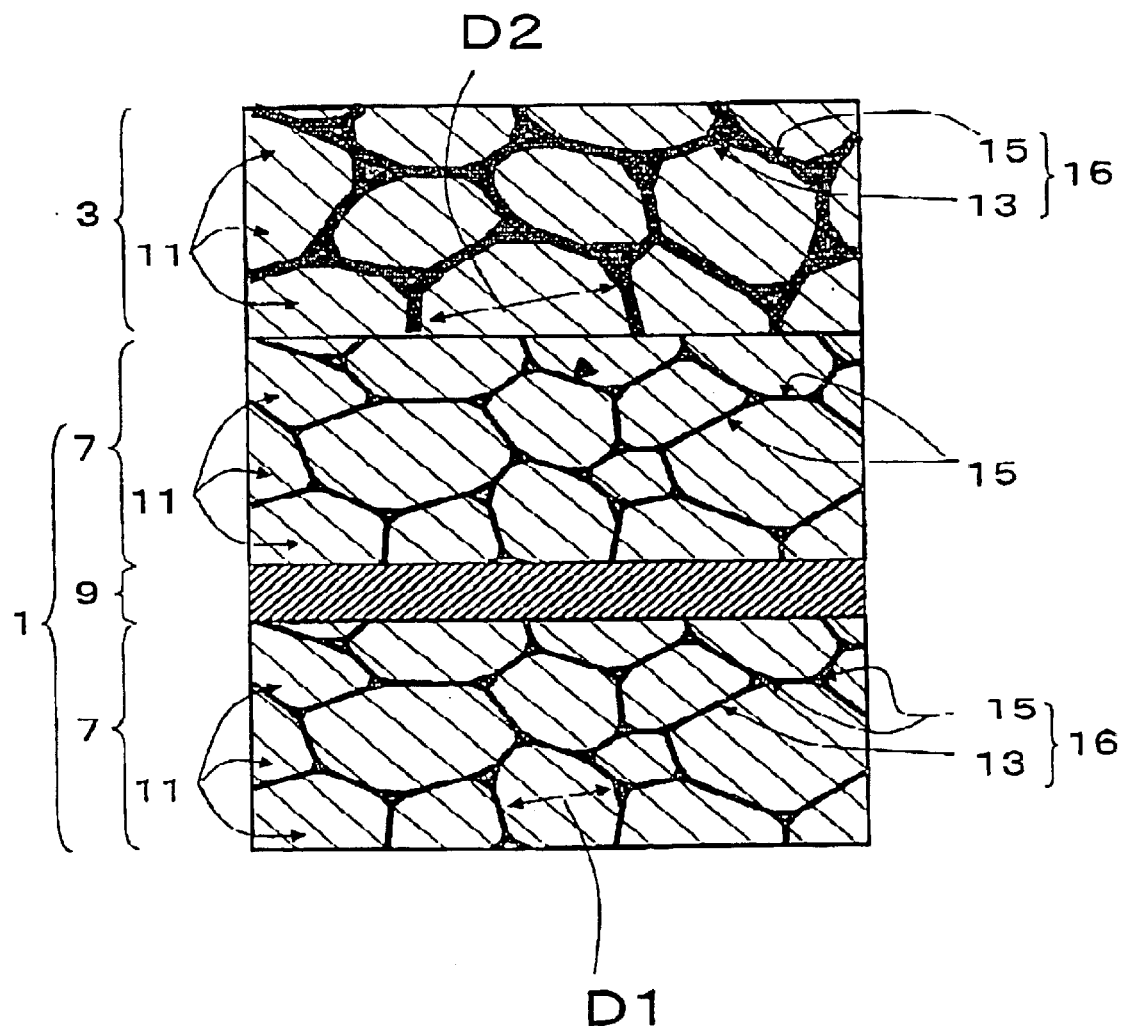
FIG. 2 is an enlarged sectional view between the effective dielectric material section and the external cover dielectric layer.
Figure 3:
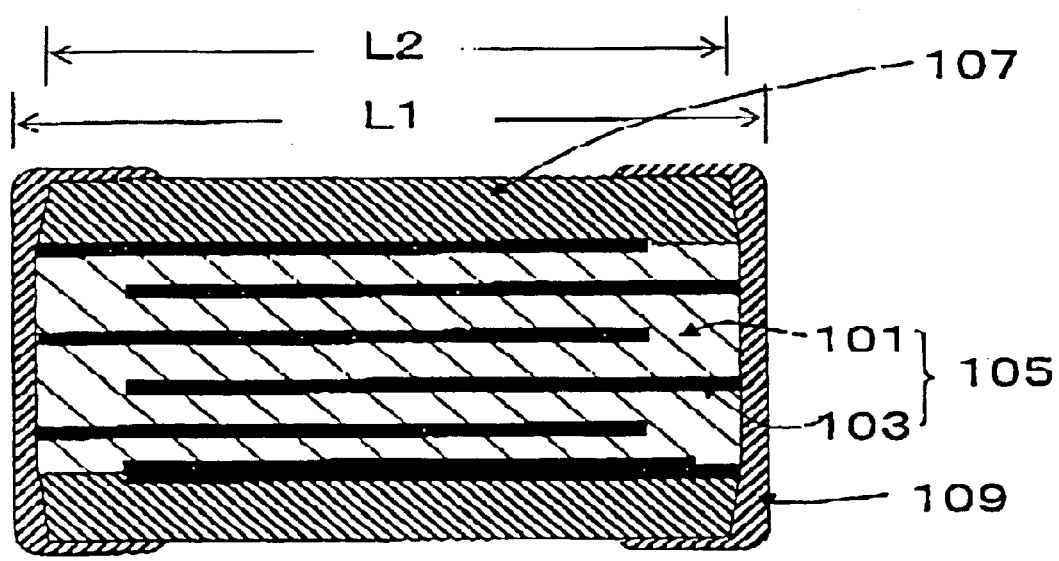
FIG. 3 is a schematic sectional view showing the multilayer ceramic capacitor where the external cover dielectric layer has shrunk compared to the effective dielectric material section.

FIG. 2 is an enlarged sectional view between the effective dielectric material section 1 and the external cover dielectric layer 7. Specifically, the dielectric ceramic layer 7 is constituted from main crystal phase 11 made of ceramic grains, grain boundary 13 and triple point grain boundary 15 formed in the interface of the main crystal phase 11. The main crystal phase 11 is made of at least $BaTiO_3$ as the main component.

The grain boundary 13 and the triple point grain boundary 15 are constituted from the secondary phase 16 including as $SiO_2$ the main component. The external cover dielectric layers 3 are also constituted from the main crystal phase 11 made of similar components as those of the dielectric ceramic layer 7 that constitutes the effective dielectric material section 1, and the secondary phase 16 consisting of the grain boundary 13 and the triple point grain boundary 15.

According to the present invention, it is important that the mean grain size (D2) of the main crystal phase 11 in the external cover dielectric layer 3 is larger than the mean grain size (D1) of the main crystal phase 11 of the dielectric ceramic layer 7, and that the amount M2 of the secondary phase in the external cover dielectric layer 3 is larger than the amount M1 of the secondary phase in the dielectric ceramic layer 7. Specifically, the mean grain size (D2) of the main crystal phase 11 in the external cover dielectric layer 3 is preferably in range from 1.1 to 1.5 times and more preferably 1.2 to 1.4 times the mean grain size (D1) of the main crystal phase 11 of the dielectric ceramic layer 7.

It is also preferable that the amount (M2) of the secondary phase in the external cover dielectric layer 3 is from 1.01 to 1.5 times, more preferably from 1.05 to 1.4 times the amount (M1) of the secondary phase in the dielectric ceramic layer 7.

According to the present invention, as the mean particle size (DG2) of the dielectric material powder on the external cover dielectric layer 3 side before firing is made larger than the mean particle size (DG1) on the dielectric ceramic layer 7 side, density before firing becomes higher and less shrinkage occurs after firing, while the starting temperature of sintering of the external cover dielectric layer 3 shifts toward higher temperatures. On the other hand, shrinkage starting temperature can be made lower so as to achieve a changing pattern near the shrinkage curve for the firing temperature of the effective dielectric material section 1, by setting the amount of glass powder (MG1) that makes the secondary phase (M2) including silicon oxide as the main component larger than the amount of glass powder (MG1) that makes the secondary phase (M1) on the dielectric ceramic layer 7 side in correspondence to the increase in the mean particle size (DG2) of the dielectric material powder on the external cover dielectric layer 3 side.

As a result, it is made possible to suppress the strain generated in the interface between the effective dielectric material section 1 and the external cover dielectric layer 3 due to the difference in shrinkage starting temperature during firing, thereby to easily manufacture the multilayer ceramic capacitor, that is free of cracks and delamination that would occur in the interface and between the internal electrode layer 9 and the dielectric ceramic layer 7 near the interface, with higher yield of production.

The mean grain size (D1, D2) of the main crystal phase 11 can be determined by the intercept method based on the observation of the cross section of the ceramics with an electron microscope. Specifically, the mean grain size is given as the length of the diagonal of a 30 μm square area in the photograph divided by the number of grains lying on the line.

Thickness of the dielectric ceramic layer 7 is 7 μm or less, preferably 5 μm or less, and more preferably 3 μm or less. Number of stacks is 100 or more, preferably 150 or more, and more preferably 200. By reducing the thickness of the dielectric ceramic layer 7 and stacking a larger number of the layers, electrostatic capacitance of the multilayer ceramic capacitor can be increased.

The mean grain size (D2, D1) of the main crystal phase 11 that constitutes the dielectric ceramic layer 7 and the external cover dielectric layer 3 is 0.5 μm or less and is preferably 0.3 μm or less, so that the present invention is best suited to the multilayer ceramic capacitor wherein mean grain size (D2, D1) of the main crystal phase that constitutes the dielectric ceramic layer 7 and the external cover dielectric layer 3 is small.

Thickness of the internal electrode layer 9 is 5 μm or less, preferably 3 μm or less, and more preferably 2 μm or less, in order to reduce the influence of stress of the internal electrode layer 9 on the effective dielectric material section 1.

The internal electrode layer 9 is preferably one kind of metal selected from a group including Ni, Cu, Ag, Ag—Pd or an alloy thereof, in order to cut down on the cost of the compact and high-capacitance multilayer ceramic capacitor, and Ni is particularly preferable since it enables simultaneous firing with $BaTiO_3$ that is the main component.

Now the process for preparing the multilayer ceramic capacitor according to the present invention will be described in detail below.

First, a dielectric material powder based on $BaTiO_3$, a glass powder that includes at least a predetermined quantity of $SiO_2$ and various additives of small quantities are dispersed in a dispersing medium that includes a binder so as to obtain a ceramic slurry. The slurry is then formed into a sheet using a known coater, for example a doctor blade, to obtain a first dielectric material green sheet that would become the dielectric ceramic layer 7 after firing.

A second dielectric material green sheet that makes an external cover layer constituting the laminate before firing, namely that would become the external cover dielectric layer 3 after firing is also made in a procedure similar to that for the first dielectric material green sheet.

Here it is important that the mean particle size of the dielectric material powder in the second dielectric material green sheet is larger than the mean particle size of the dielectric material powder in the first dielectric material green sheet, and that the amount of glass powder (MG2) in the second dielectric material green sheet is larger than the amount of glass powder (MG1) in the first dielectric material green sheet. Specifically, the mean particle size (DG2) of the dielectric material powder in the second dielectric material green sheet is preferably 1.1 to 1.5 times and more preferably 1.2 to 1.4 times the mean particle size (DG1) of the dielectric material powder in the first dielectric material green sheet.

The amount of glass powder (MG2) in the second dielectric material green sheet is preferably 1.01 to 1.5 times and more preferably 1.05 to 1.4 times the amount of glass powder (MG1) in the first dielectric material green sheet.

This constitution makes it possible to cancel the increase in the starting temperature of shrinkage of the second dielectric material green sheet that uses the dielectric material powder having larger mean particle size by the increase in the amount of glass powder, and achieve a changing pattern near the shrinkage curve for the firing temperature of the first dielectric material green sheet that would make the effective dielectric material section 1.

Thus it is made possible to suppress the stress generated in the interface between the effective dielectric material section 1 and the external cover dielectric layer 3 due to the difference in the shrinkage starting temperature during firing, thereby to prevent delamination from occurring in the interface and between the internal electrode layer 9 and the dielectric ceramic layer 7 near the interface.

According to the manufacturing method of the present invention, mean particle size (DG1, DG2) of the dielectric material powder that constitutes the first dielectric material green sheet and the second dielectric material green sheet is 0.5 μm or less and preferably 0.4 μm.

On the other hand, mean particle size of the glass powder is in a range from 0.3 to 1.2 μm, and is preferably in a range from 0.4 to 0.8 μm. The mean particle size of the dielectric material powder mentioned in the present invention refers to the mean particle size in the prepared slurry. The mean particle size of dielectric material powder mentioned in the present invention is a value corresponding to cumulative relative frequency of 50% (D50) in particle size distribution analysis.

Thickness of the first dielectric material green sheet of the present invention is 8 μm or less, preferably 6 μm or less, and more preferably 4 μm or less. Number of stacks is 100 or more, preferably 150 or more, and more preferably 200.

The first dielectric material green sheet having the internal conductor pattern formed thereon is made by printing an electrically electrode paste that includes a powder of one kind of metal selected from a group including Ni, Cu, Ag, Ag—Pd and drying it. Thickness of the internal conductor pattern is 5 μm or less and preferably 3 μm or less. Mean particle size of the metal powder for making such a thin internal conductor pattern is preferably in a range from 0.2 to 0.5 μm.

When a laminated electronic component is made by stacking a large number of layers, step between the internal electrode pattern and a portion where the internal electrode pattern is not formed, due to the thickness of the internal electrode pattern, has a significant structural influence leading to defect of the laminated electronic component. To avoid this problem, it is preferable to form a ceramic pattern by printing a dielectric ceramic paste of the same composition as that of the first dielectric material green sheet in the portion of the first dielectric material green sheet where the internal electrode pattern is not formed.

Then a plurality of the first dielectric material green sheets having the internal electrode pattern formed thereon are stacked to form the effective laminate that would develop electrostatic capacitance after firing. Then a plurality of second dielectric material green sheets that make the external cover layers are stacked on the upper and lower surfaces of the effective laminate and is processed by thermocompression bonding so as to make the laminate. The laminate is cut into predetermined size to obtain individual green compacts for the capacitor element which are not yet fired. The green compacts for the capacitor element are fired under predetermined conditions to make capacitor elements.

An external electrode paste is applied to the end faces of the capacitor element where the internal electrode layers 9 are led out as shown in FIG. 1, and is baked to make laminated ceramic electronic components provided with the external electrodes.

(Second aspect)

While the multilayer ceramic capacitor of this embodiment has basically the same structure as that of the first aspect shown in FIG. 1 and FIG. 2, it is important in this embodiment that volume proportion of the secondary phase to the main crystal phase (main phase) in the external cover dielectric layer 3 is lower than the volume proportion of the secondary phase to the main crystal phase in the dielectric ceramic layer 7.

Specifically, the volume proportion of the secondary phase to the main crystal phase in the external cover dielectric layer 3 is preferably set in a range from 60 to 95%, particularly from 70 to 90% of the volume proportion of the secondary phase to the main crystal phase in the dielectric ceramic layer 7. This makes it possible to further suppress the stress generated due to the shrinkage of the internal electrode layer 9 interposed by the dielectric ceramic layer 7 through firing, thereby to suppress the occurrence of delamination.

The volume proportion can be determined, for example, by the following equation from cross sectional areas of the main crystal phase and the secondary phase measured through observation with an electron microscope.

Volume proportion (%)={(cross sectional area of the secondary phase)/(cross sectional area of the main crystal phase)}×100

While the multilayer ceramic capacitor of this embodiment can be manufactured basically in a process similar to that for the multilayer ceramic capacitor of the first aspect shown in FIG. 1 and FIG. 2, it is important in this embodiment that the amount of glass component consisting of $SiO2$ as the main component included in the second dielectric material green sheet is less than that of the first dielectric material green sheet. Specifically, the amount of glass component in the second dielectric material green sheet is preferably set in a range from 60 to 95%, particularly from 70 to 90% of the amount of glass component in the first dielectric material green sheet. This makes it possible to delay the start of shrinkage of the second dielectric material green sheet that would become the external cover dielectric layer 3 thereby to achieve a changing pattern near the shrinkage curve for the firing temperature of the first dielectric material green sheet that would become the effective dielectric material section 1.

Thus it is made possible to suppress the stress generated in the interface between the effective dielectric material section 1 and the external cover dielectric layer 3 due to the difference in the shrinkage starting temperature during firing, thereby to prevent delamination from occurring in the interface and between the internal electrode layer 9 and the dielectric ceramic layer 7 near the interface. This embodiment is similar to the first aspect with other respects.

Various improvements and modifications can be made to the present invention within the scope of the appended claims.

The following examples further illustrate the manner in which the present invention can be practiced. It is understood, however, that the examples are for the purpose of illustration and the inventions are not to be regarded as limited to any of the specific materials or condition therein.

Example I

First, $BaTiO_3$ powder having a mean particle size of 0.3 μm was used as the ceramic powder, for making a ceramic slurry for the first dielectric material green sheet, and a glass powder including $SiO_2$ as the main component having a mean particle size of 0.6 μm was used as the sintering assisting agent. A binder solution was prepared by dissolving polyvinyl butyral and a plasticizer in a solvent for the ceramic slurry made by mixing toluene and ethanol in proportions of 1:1 by weight. $BaTiO_3$ powder and glass powder were added to the binder solution in predetermined proportions, and were dispersed by using a ball mill so as to condition the ceramic slurry. The ceramic slurry was spread over a carrier film such as polyethylene terephthalate (PET) by means of doctor blade, so as to make the first dielectric material green sheets having a thickness of 3 μm, 6 μm and 8 μm.

Ceramic slurry for the second dielectric material green sheet was prepared similarly to the process described above, except for using a dielectric material powder having a mean particle size larger than that of the ceramic slurry for the first dielectric material green sheet and increasing the quantity of the glass powder, as shown in Table 1. The ceramic slurry was spread over the carrier film by means of a doctor blade, to make the second dielectric material green sheet for the external cover having a thickness of 10 μm. Same conditions for preparing he slurry were employed for both sheets. Specifications of the slurry are shown in Table 1.

Then an electrically conductive paste including Ni was applied to the first dielectric material green sheet of various thickness to form the internal electrode pattern. The first dielectric material green sheet having the internal electrode pattern formed thereon was then peeled off the carrier film. 300 pieces of the first dielectric material green sheet were stacked one on another, and each of the upper and lower surfaces of this stack was covered by stacking 20 external cover sheets having the specified quantity of glass component thereon, thereby making the laminate of the present invention. Thickness of the internal conductor was set at 0.5 times that of each green sheet.

The laminate was cut into the shape of green compacts for the capacitor element that were degreased and fired in a reducing atmosphere to obtain the capacitor elements. Combinations of the first dielectric material green sheet and the second dielectric material green sheet are shown in Table 1.

An external electrode paste was applied to both end faces of the capacitor element and was baked to form the external electrode and make the multilayer ceramic capacitor measuring 3.2 mm in length and 2.5 mm in width.

Ceramic structures of the dielectric ceramic layer and of the external cover dielectric layer were observed with an electron microscope, to determine the mean grain size of the crystal phase including $BaTiO_3$ that was the main crystal phase and the amount of the secondary phase consisting of boundary layer and triple point boundary layer. In the present invention, proportions of the dielectric material powders and proportions of the glass components used in the first dielectric material green sheet and the second dielectric material green sheet were retained after firing.

Number of occurrences of delamination in 100 pieces of the multilayer ceramic capacitor was counted as the ratio of structural defects. Number of occurrences of cracks in 100 pieces of the multilayer ceramic capacitor was counted in soldering thermal shock resistance test at a temperature of 280° C. as an indication of reliability of the multilayer ceramic capacitor.

Similar multilayer ceramic capacitors were fabricated as comparative examples by using green sheets of dielectric material having the same glass content in the first dielectric material green sheet and the second dielectric material green sheet. Results of similar evaluation tests of the comparative examples are shown in Table 1.

TABLE 1

| Sample No. | Thickness of First Dielectric Material Green Sheet (μm) | Ratio of Mean Particle Diameter (*2) | Ratio of amount of Secondary Phase (*3) | Occurrence of Delamination (%) | Occurrence of Cracks |
|---|---|---|---|---|---|
| *I-1  | 3 | 1.3  | 1     | 85  | 5/100 |
| I-2   | 3 | 1.05 | 1.01  | 10  | 3/100 |
| I-3   | 3 | 1.1  | 1.01  | 5   | 0/100 |
| I-4   | 3 | 1.2  | 1.05  | 0   | 0/100 |
| I-5   | 3 | 1.3  | 1.1   | 0   | 0/100 |
| I-6   | 3 | 1.3  | 1.2   | 0   | 0/100 |
| I-7   | 3 | 1.3  | 1.3   | 0   | 0/100 |
| I-8   | 3 | 1.3  | 1.4   | 0   | 0/100 |
| I-9   | 3 | 1.4  | 1.4   | 0   | 0/100 |
| I-10  | 3 | 1.4  | 1.4   | 0   | 0/100 |
| I-11  | 6 | 1.5  | 1.35  | 0   | 0/100 |
| I-12  | 6 | 1.5  | 1.4   | 0   | 0/100 |
| I-13  | 6 | 1.5  | 1.45  | 0   | 0/100 |
| I-14  | 8 | 1.5  | 1.5   | 0   | 1/100 |
| *I-15 | 3 | 1.0  | 1.0   | 100 | —     |

Sample numbers marked with * are not within the scope of the present invention.
*2: Ratio of mean particle diameter of main crystal in relation of external cover dielectric layer/dielectric ceramic layer.
*3: Ratio of amount of secondary phase in relation of external cover dielectric layer/dielectric ceramic layer.

As will be apparent from Table 1, in the samples Nos. I-2 through I-14 where the mean grain size of the main crystal phase that constitutes the external cover dielectric layer was larger than that of the dielectric ceramic layer that constituted the effective dielectric material section and the amount of the secondary phase was larger, rates of occurrences of cracks and delamination between the effective dielectric material sections due to the strain caused by the difference in the firing start temperature between the external cover dielectric layer and the effective dielectric material was 10% or less after firing and was 3% or less after the soldering thermal shock resistance test.

In the samples Nos. I-3 through I-14 where the mean grain size of the main crystal phase of the external cover dielectric layer was in a range from 1.1 to 1.5 times the mean grain size of the main crystal phase of the dielectric ceramic layer, and the amount of the secondary phase was from 1.01 to 1.5 times, in particular, rates of occurrences of cracks and delamination were 5% or less after firing and were 1% or less after the soldering thermal shock resistance test.

In the comparative examples of the samples Nos. I-1 and I-15 where mean particle size and the amount of glass were made equal in the external cover dielectric layer and the dielectric ceramic layer, or either mean particle size or the amount of glass was made equal in the external cover dielectric layer or the dielectric ceramic layer, in contrast, delamination occurred in the interfaces between the external cover dielectric layer and the dielectric ceramic layer of all multilayer ceramic capacitors after firing.

Example II

First dielectric material green sheets having a thickness of 3 μm, 6 μm and 8 μm were made on carrier films similarly to Example I.

The second dielectric material green sheet for the external cover 10 μm in thickness was made similarly to the process described above, except for using a ceramic slurry for the second dielectric material green sheet with the glass content being controlled in a range from 60 to 95% by weight to that of the first dielectric material green sheet.

Then an electrically conductive paste including Ni was applied to the first dielectric material green sheets of various thickness to form the internal electrode pattern. The first dielectric material green sheets having the internal electrode pattern formed thereon were peeled off the carrier films. 300 pieces of the first dielectric material green sheet were stacked one on another, and each of the upper and lower surfaces of this stack was covered by stacking 20 external cover sheets having the specified quantity of glass component thereon, thereby making the laminate of the present invention.

The laminate was cut into the shape of green compacts for the capacitor element that were degreased and fired in a reducing atmosphere to obtain the capacitor elements. Combinations of the first dielectric material green sheet and the second dielectric material green sheet are shown in Table 1.

An external electrode paste was applied to both end faces of the capacitor element and was baked to form the external electrode and make the multilayer ceramic capacitors measuring 3.2 mm in length and 2.5 mm in width.

Ceramic structures of the dielectric ceramic layer and the external cover dielectric layer were observed with an electron microscope, to determine the difference in the volume proportion between the grains including $BaTiO_3$ that was the main crystal phase and the secondary phase (boundary layer and triple point boundary layer). The mean grain size of the main crystal phase that constituted the dielectric ceramic layer and the external cover dielectric layer was 0.5 μm.

Number of occurrences of delamination in 100 pieces of the multilayer ceramic capacitor was counted as the rate of structural defects. Number of occurrences of cracks in 100 pieces of the multilayer ceramic capacitor was counted in soldering, thermal shock resistance test at a temperature of 280° C. as an indication of reliability, and failure rate in 300 pieces after operating at 85° C. with 64V for 48 hours was determined.

Similar multilayer ceramic capacitors were fabricated as comparative examples by using green sheets of dielectric material having the same glass content as in the first dielectric material green sheet and the second dielectric material green sheet. Results of similar evaluation tests of the comparative examples are shown in Table 2 along with the results of testing the present invention.

TABLE 2

| Sample No. | Thickness of First Dielectric Material Green Sheet (μm) | Volume Proportion of Secondary Phase (*4) (Volume %) | Occurrence of Delamination After Firing (%) | Occurrence of Delamination After Soldering Thermal Shock Resistance Test (%) | Failure Rate in High-Temperature Loading Test (%) |
|---|---|---|---|---|---|
| II-1 | 3 | 70 | 0 | 0 | 0 |
| II-2 | 3 | 80 | 0 | 0 | 0 |

TABLE 2-continued

| Sample No. | Thickness of First Dielectric Material Green Sheet (μm) | Volume Proportion of Secondary Phase (*4) (Volume %) | Occurrence of Delamination After Firing (%) | After Soldering Thermal Shock Resistance Test (%) | Failure Rate in High-Temperature Loading Test (%) |
|---|---|---|---|---|---|
| II-3 | 3 | 90 | 0 | 0 | 0 |
| II-4 | 5 | 60 | 1 | 2 | 0 |
| II-5 | 5 | 70 | 0 | 0 | 0 |
| II-6 | 5 | 80 | 0 | 0 | 0 |
| II-7 | 5 | 90 | 0 | 0 | 0 |
| II-8 | 5 | 95 | 1 | 2 | 0 |
| *II-9 | 5 | 100 | 100 | 6 | 0.3 |
| II-10 | 8 | 70 | 0 | 0 | 0 |

Sample numbers marked with * are not within the scope of the present invention.
*4: (Volume propotion of secondary phase in dielectric ceramic layer)/(volume propotion of second phase in external cover dielectiric layer)

As will be apparent from Table 2, in the samples Nos. II-1 through II-8 and II-10 where volume proportion of the secondary phase including $SiO_2$ as the main component in the ceramic composition that constituted the external cover dielectric layer was less than the volume proportion of the secondary phase of the dielectric ceramic layer that constituted the effective dielectric material section, rate of occurrences of delamination due to stress caused by the difference in the firing start temperature between the external cover dielectric layer and the effective dielectric material was 1% or less after firing, 2% or less after the soldering thermal shock resistance test and failure rate in high-temperature loading test was 0%. In the samples Nos. II-1 through II-3, III-5 through III-7 and III-10 where the proportions described above were in a range from 60 to 90%, in particular, delamination did not occur after firing and after the soldering thermal shock resistance test.

In sample No. II-9 where the external cover dielectric layer and the dielectric ceramic layer were made with the same composition of ceramics, delamination occurred in the interfaces between the external cover dielectric layer and the dielectric ceramic layer of all multilayer ceramic capacitors after firing, and failure rate in high-temperature loading test was 0.3%.

What is claimed is:

1. A multilayer ceramic capacitor comprising:
an effective dielectric material section made by stacking dielectric ceramic layers, that include a main crystal phase comprising at least $BaTiO_3$ as main component and a secondary phase comprising mainly $SiO_2$ which forms grain boundary and triple point boundary, and internal electrode layers alternately one on another;
external cover dielectric layers that are formed on the upper and lower surfaces in the stacking direction of said effective dielectric material section and include a main crystal phase and a secondary phase comprising at least the same components as those of said dielectric ceramic layer; and
external electrodes that are electrically connected with the internal electrode layers led out onto both end faces of said effective dielectric material section which includes said external cover dielectric layers, wherein said external cover dielectric layers comprises ceramics having lower sinterability than the dielectric ceramic layer of said effective dielectric material section.

2. The multilayer ceramic capacitor according to claim 1, wherein the mean grain size of said main crystal phase in said external cover dielectric layer is larger than the mean grain size of said main crystal phase in said dielectric ceramic layer, and the amount of said secondary phase in said external cover dielectric layers is more than the amount of said secondary phase in the dielectric ceramic layer.

3. The multilayer ceramic capacitor according to claim 2, wherein a ratio D2/D1 of the mean grain size of the main crystal phase (D2) in the external cover dielectric layer to the mean grain size of the main crystal phase (D1) in the dielectric ceramic layer is in a range from 1.1 to 1.5.

4. The multilayer ceramic capacitor according to claim 2, wherein a ratio M2/M1 of the amount of the secondary phase (M2) in the external cover dielectric layer to the amount of the secondary phase (M1) in the dielectric ceramic layer is in a range from 1.01 to 1.5.

5. The multilayer ceramic capacitor according to claim 1, wherein a volume proportion of the secondary phase to the main crystal phase in said external cover dielectric layer is lower than the volume proportion of the secondary phase to the main crystal phase in said dielectric ceramic layer.

6. The multilayer ceramic capacitor according to claim 5, wherein a volume proportion of the secondary phase to the main crystal phase in said external cover dielectric layer is 60 to 95% of the volume proportion of the secondary phase to the main crystal phase in said dielectric ceramic layer.

7. The multilayer ceramic capacitor according to claim 1, wherein the thickness (t1) of the effective dielectric material section and the thickness (t2) of the external cover dielectric layer satisfy the relation of $t2/t1 \geq 0.05$.

8. The multilayer ceramic capacitor according to claim 1, wherein the thickness of the dielectric ceramic layer is 7 μm or less and 100 or more dielectric ceramic layers are stacked.

9. The multilayer ceramic capacitor according to claim 1, wherein the mean grain size of the main crystal phase that constitutes the dielectric ceramic layers and the external cover dielectric layers is 0.5 μm or smaller.

* * * * *